May 22, 1956

J. L. PERKINS 2,746,179

IMPROVED COVERS AND COVER MATERIALS
FOR TEMPORARY PROTECTION OF SHOES
Filed Oct. 24, 1952

Inventor
John L. Perkins
By his Attorney

2,746,179

IMPROVED COVERS AND COVER MATERIALS FOR TEMPORARY PROTECTION OF SHOES

John L. Perkins, Hingham, Mass., assignor to B. B. Chemical Co., Boston, Mass., a corporation of Massachusetts Application October 24, 1952, Serial No. 316,733

5 Claims. (Cl. 36—72)

This invention relates to a temporary protective cover material, and covers particularly for protecting the uppers of shoes from being soiled or stained during various shoe-making operations.

Temporary protective coverings for shoe uppers are used to prevent soiling or staining in the course of manufacturing. These coverings must remain in protective relation to the shoe upper during manufacture but must be readily removable when the need for protection is passed. A highly satisfactory protective covering which is applicable to a shoe upper by heat and pressure is shown and described in the United States Letters Patent No. 2,651,857 to Stanley M. Griswold and Harold C. Reynolds, Jr., granted September 15, 1953, entitled Methods and Covers for Temporary Protection of Shoes. The protective cover of that application is formed of a flexible sheet material having a non-pressure-sensitive heat-activatable coating bonded to the sheet. The adhesive is an intimate mixture of a high molecular weight organic polymer and a low molecular weight non-polar normally crystalline organic compound, e. g., a mixture of a rubber and a wax. This adhesive coating is non-pressure-sensitive and covers formed of sheet material provided with such an adhesive coating are readily positioned on and satisfactorily secured to a shoe upper to provide effective cover for the shoe.

In factory operations involving the use of such a shoe cover, the precut shoe covers are ordinarily nested or stacked for removal one by one by the operator and application to shoes. The extreme thinness of the shoe cover material and the resistance to slipping of the rubber and wax adhesive with respect to itself or to the uncoated side of the shoe cover has caused some difficulty with the high speed application of shoe covers to shoes. That is, the simple separation of the non-adhering but closely adjacent layers of two shoe covers has been found to consume a certain amount of time. Initial efforts to improve the ease of slipping between the adhesive layer and other surfaces involved the use of talc or starch which are materials customarily used for this purpose. These materials were effective to improve slip but interfered with the ultimate bond to an extent which rendered their use undesirable.

It is a feature of the present invention to provide a temporary protective cover material and shoe cover wherein a thin flexible sheet material having a non-pressure-sensitive heat-activatable adhesive coating bonded on one side is provided on the surface of the adhesive layer with a thin screen of a finely divided material which operates to facilitate slip between the adhesive and other surfaces prior to activation of the adhesive and which does not interfere with but may improve the strength of bond between the adhesive and another surface against which the adhesive has been pressed in heat-activated condition.

According to the present invention, a flexible, preferably stretchable sheet material having a non-pressure-sensitive heat-activatable coating firmly bonded to the sheet is provided with a thin screen of silica aerogel particles distributed upon the exposed surface of the adhesive layer. It has been found that the aerogel particles effectively screen the anti-slip character of the adhesive coated surface with respect to other surfaces so that sheets of the material or covers are readily separated from nests, piles or stacks. It was also found that far from interfering with the action of the adhesives when activated, the screen of silica aerogel particles merges into the adhesive layer and actually gives a firmer, somewhat stronger bond between the shoe cover material and the surface of a shoe, while at the same time permitting the clean stripping of the cover from the shoe when desired.

The invention will be further described in connection with the accompanying drawings forming part of the present disclosure. In the drawings, Fig. 1 is a diagrammatical view illustrating a procedure which may be employed for the manufacture of shoe cover material according to the present invention;

Figure 2:
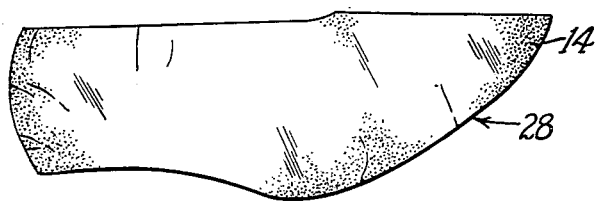
Fig. 2 is a side view of a protective cover according to the present invention.

The protective cover material according to the present invention includes a base sheet 10 carrying a film 12 of special heat-activatable, non-pressure-sensitive adhesive on one surface and having a screen 14 of finely divided silica aerogel particles distributed on the free surface of the adhesive. The nature and preparation of the associated based sheet 10 and special adhesive 12 are more fully described in the patent to Griswold and Reynolds, No. 2,651,857, referred to above. Briefly, however, the base sheet 10 is preferably formed of cyclized rubber commercially known as "Pliofilm," although certain other flexible plastic films or even paper may be used. The preferred adhesive is a combination of a wax and a high molecular weight rubbery polymer such as natural rubber or various synthetic rubbers, the wax and rubbery material being in the ratio of from 1:4 to 4:1. As noted in that application, in such adhesive compositions, the wax softens or swells and plasticizes the rubbery polymer when the composition is heated; and the composition in heated condition is pressure-sensitive. At room temperatures the wax apparently crystallizes and no longer serves to soften or plasticize the rubbery polymer and the composition shrinks in volume and loses pressure sensitivity.

On the surface of the adhesive, there is provided a thin uniform screen 14 of finely divided, desirably two to five microns in particle size, silica aerogel. With an adhesive layer 0.001 inch in thickness there will preferably be employed from 36 to 40 mg. per square foot of the silica aerogel particles; but variations of 25% plus or minus, i. e., from about 25 to about 50 mg. per square foot, may be used. With thicker adhesive layers higher surface concentrations may be used; while with thinner adhesive layers it may be desirable to use the lower surface concentrations. Silica aerogel is distinguished from soft silica hydrogel and in the article of the present invention is employed as a finely divided powder which may be produced according to the method set forth in the United States patent to Kistler, No. 2,093,454. As more fully explained in that patent, the aerogels possess an extremely high percentage of void space, and consequent very low dry bulk density, i. e., a bulk density which may be as low as 2 to 3 pounds per cubic foot. The true specify gravity of the aerogel is 2.2.

The screen 14 of particles of silica aerogel on the surface of the adhesive functions to facilitate slip between the surface of the adhesive and other surfaces. A method for securing this relationship between the adhesive and the aerogel particles, as shown diagrammatically in Fig. 1, involves application to the sheet material of a thin layer 12 of an aqueous emulsion of rubber and wax. Conventional coating means 16 are used to apply a uniform layer of the emulsion to the film 10. The coated film is carried on a moving belt 18 through a heated drying zone, as for example, beneath a battery 20 of infrared lamps, to remove the water and to form a continuous dry layer of the mixture of wax and rubber. Thereafter, and preferably, but not necessarily, while the material is still warm from the infrared drying treatment, silica aerogel powder is deposited from a duster 22 on the surface of the adhesive, and the sheet is passed beneath a sponge rubber roll 24 which lightly presses the silica aerogel into the surface of the adhesive. Excess silica aerogel powder is removed from the surface of the adhesive by the suction nozzle 26 and the silica aerogel treated sheet material is then rolled up.

A shoe cover 28 formed of this sheet material and disposed with the silica aerogel screened adhesive coated surface turned outward is shown in Fig. 2. The construction of the shoe cover 28 is described more fully in the above referred to patent to Giswold and Reynolds No. 2,651,857. Briefly, however, the sheet is cut to an area and shape with reference to a shoe to be covered such that the finished cover will extend over and cover the shoe upper. The sheet is folded along a center line and the rear marginal portions are secured together to provide a pocket for receiving the back portion of a shoe. For convenience in application, the cover 28 is then turned so that the adhesive and silica aerogel coated surface faces out.

Figure 3:
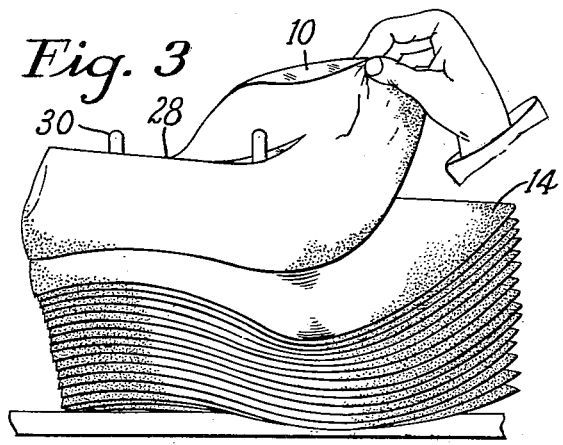
Fig. 3 is an elevational view of a number of covers in nested relationship, illustrating the manner in which they are separated for use.
Figure 4:
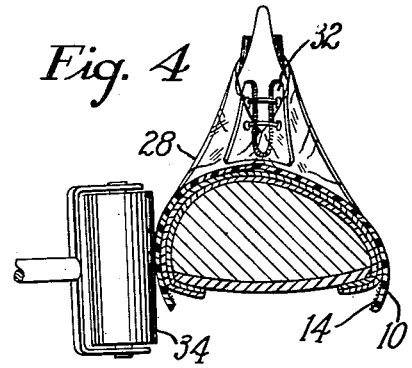
Fig. 4 is a transverse sectional view of a lasted shoe upper with a temporary protective cover thereon, illustrating the bonding of a shoe cover to a lasted shoe upper.

Sheets of shoe cover material or shoe covers either in the flat condition or in the roughly formed condition with the marginal portions secured together, are piled, nested or stacked for use to protect shoes during shoemaking. In the shoemaking operation, one cover at a time is removed from the nested covers 28 on the rack 30, for example as shown in Fig. 3 and positioned around a lasted shoe 32 with the adhesive coated and silica aerogel screened surface against the surface of the shoe. A heated tool is run along the outside of a shoe cover 28 adjacent the edge to soften the adhesive coating and press it into engagement with the surface of a shoe upper 32 adjacent the edge as shown in Fig. 4. A light but adequate bond is formed between the surface of a shoe upper and the adhesive coating.

With the screen 14 of silica aerogel particles on the surface of the adhesive layer 12, the covers 26 slip readily with respect to adjacent covers in the stack 50 and are readily separated from other covers for application to a shoe. Additionally, after the adhesive has been activated, and pressed against the shoe, the silica aerogel particles merge with and reinforce the adhesive, and a thoroughly adequate bond at all desired points is formed between the cover 28 and the shoe upper 32. In fact, the bond is somewhat greater than that between a similar shoe cover without the silica aerogel screen, but with the same adhesive coating. On the other hand, a layer of a conventional dusting agent, for example, talc, has a tendency to "mask" the adhesive so that adhesion is only secured irregularly throughout the area in which the adhesion is desired.

The following example is given to aid in understanding the invention. It is to be understood that the invention is not limited to the specific ingredients or proportions, nor to special procedural details of the example:

*Example.*—A wax emulsion was prepared comprising 99 parts by weight of paraffin wax, 122 parts of water, 0.43 part by weight of high viscosity carboxy methyl cellulose, 6 parts by weight of triethanolamine and 10 parts by weight of stearic acid. Forty (40) parts by volume of the above emulsion were combined with 30 parts by volume of a 60% natural rubber latex and 10 parts by volume of a 50% solids content latex of a copolymer of butadiene and styrene in the ratio of 25% butadiene and 75% styrene together with 0.2 part by volume of the dioctyl ester of sodium sulfosuccinic acid (Deceresol OT).

Figure 1:
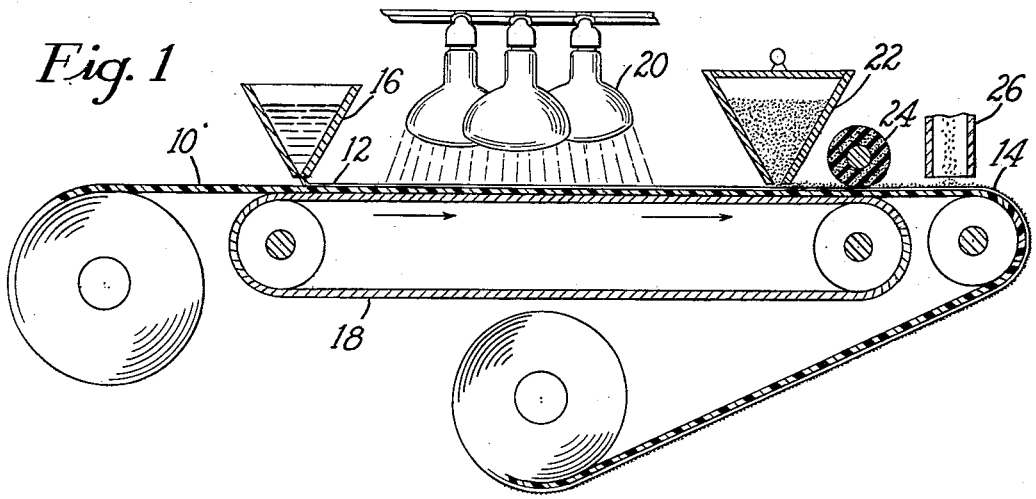

A sheet of rubber hydrochloride 0.0012″ in thickness was given a very thin base coating of a solution of cyclized rubber in toluol. As shown in Fig. 1, the rubber hydrochloride sheet with the dried film 10 of cyclized rubber thereon was passed beneath a cement applying device 16 at which point there was applied a 0.002″ thick coating 12 of the blend of wax emulsion and rubber latices. This coating was dried beneath a battery 20 of heating lamps. Thereafter a screen of silica aerogel particles having a particle size of 2 to 3 microns was distributed on the surface and the sheet was then passed beneath a sponge-rubber roller 24 pressing lightly on the surface. Excess silica aerogel was removed from the surface of the sheet by the suction nozzle 26. The screen 14 of aerogel deposited on the sheet varied in surface concentration from 36 to 40 mgs. per square foot. The concentration of silica aerogel was kept within 25% plus or minus of this surface concentration.

A section of this adhesive coated and silica aerogel screened sheet was cut to shape and size to extend to the marginal area of a shoe upper to be covered and was folded with the coated surface inward. The margins at one end were heated and pressed together to provide a pocket for the heel portion of a shoe on a last. The shoe cover 28 was then turned inside out and nested with a number of other shoe uppers on a rack 30, with the coated portion of one shoe cover adjacent the uncoated portion of an adjacent shoe cover.

In the covering of shoes, a single shoe cover 28 was readily separated from the nested shoe covers on the rack 30 and displayed no tendency to resist movement relative to the adjacent shoe cover 28 even though the shoe covers were pressed together by the fingers of the operator when separating one from the other. This shoe cover 28 was placed with its heel portion against the heel portion of a lasted women's white leather shoe upper and was turned right side out to bring it into protective relation to the shoe with the heel portion of the shoe upper in the pocket of the cover. The cover was secured to the shoe upper by pressing it against the edge portions of a shoe upper adjacent to the featherline with a heated metal roller at a temperature of 200° F., and portions of the cover extending below the edge of the shoe upper were trimmed off with a hot knife at a temperature of 400° F.

The covered shoe upper was then subjected to normal shoe operations such as roughening of the lasted margin, and cement sole attaching and passage through a drying oven. Upon completion of shoemaking operations, the cover was stripped off cleanly and easily leaving the leather of the shoe upper free from spots or stains.

Having described my invention, what I claim as new and desire to secure by Letters Patent of the United States is:

1. A temporary protective cover material comprising a flexible sheet, a layer of heat-activatable adhesive bonded to one face of said sheet for forming a readily rupturable bond to a surface to be protected, and a thin screen of finely divided silica aerogel particles distributed upon the exposed surface of said adhesive layer, said screen of silica aerogel particles serving to facilitate slip between said layer of adhesive and other surfaces prior to activation of said adhesive and also serving to improve the strength of bond between the adhesive layer and a surface to be protected by the cover material.

2. A temporary protective cover material comprising a flexible sheet, a layer of heat-activatable adhesive bonded to one face of said sheet for forming a readily rupturable bond to a surface to be protected, and a thin screen of from 25 to 50 mgs. per square foot of silica aerogel particles of from 2 to 5 microns in size distributed upon the exposed surface of said adhesive layer, said adhesive comprising an intimate mixture of a wax and a high molecular weight rubbery organic polymer in the ratio of from 4:1 to 1:4 parts by weight and being non-tacky and non-pressure-sensitive, said screen of silica aerogel particles serving to facilitate slip between said layer of adhesive and other surfaces prior to activation of said adhesive and also serving to improve the strength of bond between the adhesive layer and a surface to be protected by the cover material.

3. A temporary protective cover for use in shoemaking to guard the upper of a shoe from soiling during shoemaking operations comprising a flexible, stretchable, isomerized rubber sheet bent to conform generally to the shape of a shoe and having a width and length sufficient to extend to the lasting margin of a shoe to be covered when the cover is placed on a shoe, a layer of a heat-activatable adhesive bonded to the inner face of said sheet for forming a readily rupturable bond to a shoe to be protected, and a thin screen of from 25 to 50 mgs. per square foot of silica aerogel particles of from 2 to 5 microns in size distributed upon the exposed surface of said adhesive layer, said adhesive comprising an intimate mixture of a wax and a high molecular weight rubbery organic polymer in the ratio of from 4:1 to 1:4 parts by weight and being non-tacky and non-pressure-sensitive, said screen of said silica aerogel particles serving to facilitate slip between said layer of adhesive and other surfaces prior to activation of said adhesive and also serving to improve the strength of bond between the adhesive layer and the surface of the upper of a shoe to be protected by the cover, marginal portions of said sheet brought together by said bending being secured together by fused together portions of said layer of adhesive to provide a pocket for receiving an end portion of a shoe.

4. A temporary protective cover for use in shoemaking to guard the upper of a shoe from soiling during shoemaking operations comprising a flexible, stretchable, isomerized rubber sheet bent to conform generally to the shape of a shoe and having a width and length sufficient to extend to the lasting margin of a shoe to be covered when the cover is placed on a shoe, a layer of a heat-activatable adhesive bonded to the inner face of said sheet for forming a readily rupturable bond to a shoe to be protected, and a thin screen of from 25 to 50 mgs. per square foot of silica aerogel particles of from 2 to 5 microns in size distributed upon the exposed surface of said adhesive layer, said adhesive comprising an intimate mixture of paraffin wax, natural rubber and a butadiene styrene copolymer synthetic rubber comprising from 50% to 75% styrene, the ratio of the wax to the combined weight of natural and synthetic rubber being from 1:2 to 2:1 parts by weight, the adhesive being non-tacky and non-pressure-sensitive, said screen of silica aerogel particles serving to facilitate slip between said layer of adhesive and other surfaces prior to activation of said adhesive and also serving to improve the strength of bond between the adhesive layer and the surface of the upper of a shoe to be protected, marginal portions of said sheet brought together by said bending being secured together by fused together portions of said layer of adhesive to provide a pocket for receiving an end portion of a shoe.

5. In combination, a flexible sheet, a layer of heat activatable adhesive bonded to one face of said sheet and a thin screen of from 25 to 50 mgs. per square foot of silica aerogel particles of from 2 to 5 microns in size distributed upon the exposed surface of said adhesive layer, said screen of silica aerogel particles serving to facilitate slip between said layer of adhesive and other surface prior to activation of said adhesive and also serving to improve the strength of bond formed between the adhesive layer and a surface against which the adhesive layer is pressed in heat activated condition.

References Cited in the file of this patent
UNITED STATES PATENTS

| | | |
|---|---|---|
| 2,410,878 | Harrington | Nov. 12, 1946 |
| 2,651,857 | Griswold et al. | Sept. 15, 1953 |
| 2,673,520 | Bainbridge | Mar. 30, 1954 |

FOREIGN PATENTS

| | | |
|---|---|---|
| 505,502 | Great Britain | May 11, 1939 |